(12) United States Patent
Cheng (10) Patent No.: US 9,289,033 B2
(45) Date of Patent: Mar. 22, 2016

(54) METHOD OF MANUFACTURING A HOOK MEMBER OF A HOOK-AND-LOOP FASTENER AND A HOOK MEMBER MANUFACTURED BY THE METHOD

(71) Applicant: Taiwan Paiho Limited, Chang Hwa Hsien (TW)

(72) Inventor: Allen Cheng, Chang Hwa Hsien (TW)

(73) Assignee: Taiwan Paiho Limited (TW)

( * ) Notice: Subject to any disclaimer, the term of this patent is extended or adjusted under 35 U.S.C. 154(b) by 553 days.

(21) Appl. No.: 13/771,274

(22) Filed: Feb. 20, 2013

(65) Prior Publication Data

US 2014/0075724 A1    Mar. 20, 2014

(30) Foreign Application Priority Data

Sep. 14, 2012   (TW) .............................. 101133798 A (51) Int. Cl.
```
B32B 37/00      (2006.01)
A44B 18/00      (2006.01)
B29C 65/08      (2006.01)
B29C 65/00      (2006.01)
B29C 65/18      (2006.01)
B29L 31/00      (2006.01)
```

(52) U.S. Cl.
CPC .......... *A44B 18/0049* (2013.01); *A44B 18/0061* (2013.01); *A44B 18/0065* (2013.01); *B29C 65/08* (2013.01); *B29C 65/18* (2013.01); *B29C 66/1122* (2013.01); *B29C 66/474* (2013.01); *B29C 66/69* (2013.01); *B29C 66/7392* (2013.01); *B29C 66/81427* (2013.01); *B29C 66/81431* (2013.01); *B29C 66/8322* (2013.01); *B29C 66/729* (2013.01); *B29L 2031/729* (2013.01); *Y10T 24/27* (2015.01)

(58) Field of Classification Search
CPC ........... A44B 18/0049; A44B 18/0061; A44B 18/0065; B29C 66/474; B29C 66/69; B29C 66/7392; B29C 65/18
USPC ........................... 156/73.1, 253, 580.1, 580.2
See application file for complete search history.

(56) References Cited

U.S. PATENT DOCUMENTS

| | | | | | |
|---|---|---|---|---|---|
| 4,881,997 | A | * | 11/1989 | Hatch ................. | A44B 18/0076 156/245 |
| 4,999,067 | A | * | 3/1991 | Erb ..................... | A44B 18/0049 156/242 |
| 5,830,298 | A | * | 11/1998 | Jackson .............. | A44B 18/0011 156/178 |
| 6,604,264 | B1 | * | 8/2003 | Naohara ............. | A44B 18/0011 24/444 |
| 8,790,475 | B2 | * | 7/2014 | Cheng ................. | A44B 18/0034 156/176 |

(Continued)

*Primary Examiner* — James Sells
(74) *Attorney, Agent, or Firm* — Bacon & Thomas, PLLC (57) ABSTRACT

The present invention provides a novel method for manufacturing a hook member of a hook-and-loop fastener. The method comprises the steps of: providing a plurality of plastic monofilaments (such as polypropylene (PP) monofilaments); forming a plurality of loops on each of the plurality of plastic monofilaments such that each of the plurality of plastic monofilaments has a plurality of loop portions and flat portions between adjacent loop portions; covering the flat portions of the plurality of plastic monofilaments with a web of substrate; fusing the flat portions of the plurality of plastic monofilaments to the substrate so as to fix the plurality of loop portions of the plastic monofilaments onto the substrate; and converting the plurality of loop portions into a plurality of hook elements to thereby producing the hook member that comprises a plurality of hook elements.

19 Claims, 9 Drawing Sheets

(56) References Cited

U.S. PATENT DOCUMENTS

| | | | | |
|---|---|---|---|---|
| 2008/0260989 A1* | 10/2008 | Lester | ................ | A44B 18/0011 428/100 |
| 2010/0180407 A1* | 7/2010 | Rocha | .................... | B29C 59/04 24/452 |
| 2010/0239699 A1* | 9/2010 | Banker | ............... | A44B 18/0049 425/115 |
| 2012/0042483 A1* | 2/2012 | Cheng | ................ | A44B 18/0049 24/442 |
| 2012/0096688 A1* | 4/2012 | Cheng | ................ | A44B 18/0034 24/442 |

* cited by examiner

METHOD OF MANUFACTURING A HOOK MEMBER OF A HOOK-AND-LOOP FASTENER AND A HOOK MEMBER MANUFACTURED BY THE METHOD

FIELD OF THE INVENTION

The present invention relates generally to mechanical fasteners, and more specifically to a method for manufacturing a hook member of a hook-and-loop fastener and a hook member manufactured by the method.

BACKGROUND OF THE INVENTION

A hook-and-loop type fastener is a well know mechanical fastener and wildly used in a variety of fields that need to fasten two separate parts together, such as garment, hats/caps, shoes, personal care product (such as diapers) etc., because of its easy engaging/disengaging characteristic. The hook-and-loop type fastener mainly consists of a hook member on which an array of hooks are formed and a loop member on which a plurality of loops are formed to be engage with the hooks of the hook strap.

Figure 1A:
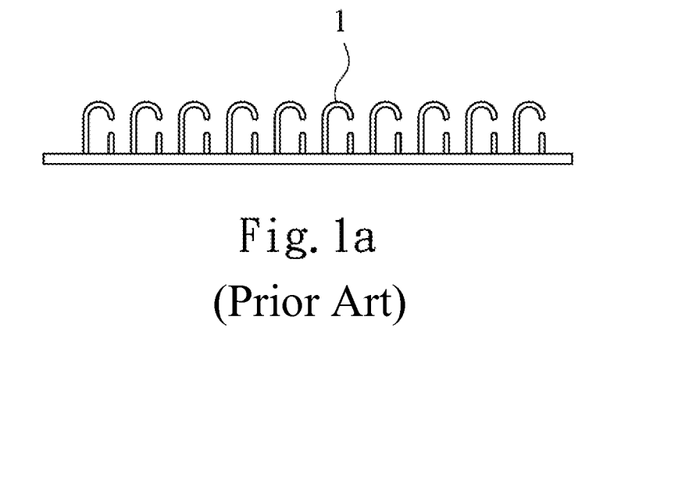
FIG. 1a is a schematic enlarged drawing showing a hook portion of a hook-and loop fastener manufactured according to a traditional knitting method.
Figure 1B:
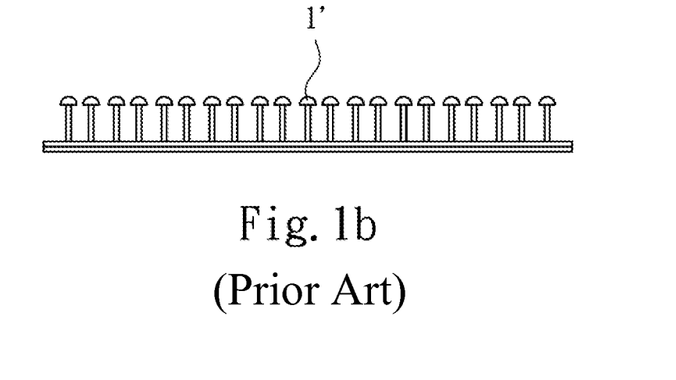
FIG. 1b is a schematic enlarged drawing showing a hook portion of a hook-and loop fastener manufactured according to another traditional knitting method.

One of the traditional methods of manufacturing a hook strap of a hook-and-loop type fastener is to form a plurality of plastic loops on a fabric substrate by means of a plastic monofilament which is knitted and fixed to the fabric substrate by beans of a weft and a warp; and then perform a side-cutting process to the plastic loops formed on the substrate to turn the plastic loops into hook-shaped elements 1 as illustrated in FIG. 1a. Alternatively, instead of performing a side-cutting process, a thermal melting operation is performed to the plastic loops by using a heating element to turn the treated loops into mushroom-type hook elements 1' as illustrated in FIG. 1b.

Although the above-mentioned traditional knitting method is able to manufacture a hook member of a hook-and-loop fastener, yet it takes at least three filaments, i.e., a weft, a warp and a plastic monofilament, to form and fix the hook elements onto the substrate, and this is a relatively complex and time-consuming manufacturing process.

In view of the shortcomings of traditional method of manufacturing a hook member described above, there exists a need for a manufacturing method that manufactures the hook member in a simpler, faster and more convenient way to form and fix the hook elements onto the substrate.

SUMMARY OF THE INVENTION

The object of the present invention is to provide a method of manufacturing a hook member of a hook-and-loop fastener that manufactures the hook member in a simpler, faster and more convenient way to form and fix the hook elements onto a substrate.

The above object may be achieved by a method of manufacturing a hook member of a hook-and-loop fastener which comprises the steps of:

providing a plurality of plastic monofilaments;

forming a plurality of loops on each of the plurality of plastic monofilaments such that each of the plurality of plastic monofilaments has a plurality of loop portions and flat portions between adjacent loop portions;

covering the flat portions of the plurality of plastic monofilaments with a web of substrate;

fusing the flat portions of the plurality of plastic monofilaments to the substrate so as to fix the plurality of loop portions of the plastic monofilaments onto the substrate; and converting the plurality of loop portions into a plurality of hook elements to thereby producing the hook member that comprises a plurality of hook elements.

According to an embodiment of the present invention, the step of converting the loop portions into hook elements comprises a step of performing a side-cutting process to the loop portions at a predetermined height above the substrate to form hook elements having hook-shaped heads.

According to another embodiment of the present invention, the step of converting the loop portions into hook elements comprises a step of performing a thermal melting process to the loop portions at a top end thereof to form hook elements having mushroom-shaped heads.

According to a preferred embodiment of the present invention, the step of providing a plurality of plastic monofilaments comprises a step of providing the plurality of plastic monofilaments to a mold having a number of parallel grooves spaced apart each other, wherein the grooves extend in a direction perpendicular to the longitudinal direction of the plastic monofilaments. The step of forming a plurality of loop portions comprises a step of pushing the portions of the plurality of plastic monofilaments laying on top of the grooves of the mold down into corresponding grooves with a loop forming device having a number of rods arranged corresponding to the grooves to form the loop portions of the plastic monofilaments and the portions laying on the surface of the mold forming the flat portions, The step of fusing the flat portions of the plurality of plastic monofilaments to the substrate comprises a step of pressing the substrate against the mold with the fusing device and fusing the substrate and the flat portions together by applying thermal energy or ultra sound energy thereto.

According to an embodiment of the present application, the method further comprises a de-molding step after the fusing step, The de-molding step comprises: moving the fusing device away from the mold; sidewayly withdrawing the rods of the loop forming device from the groves; and de-molding the substrate with a plurality of loops forming thereon from the mold by means of a de-molding roller. The side-cutting process is performed with a blade to cut at one side of the loops when the substrate with a plurality of loops forming thereon passes through the de-molding roller, The thermal melting process is performed with a heating device disposed oppose to the de-molding roller to melt the top portions of the loops when the substrate having a plurality of loops forming thereon passes through the de-molding roller.

Another aspect of the present invention provides a hook member of a hook-and-loop fastener according to the above-mentioned method.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings, wherein.

DETAILED DESCRIPTION OF THE INVENTION

Figure 2:
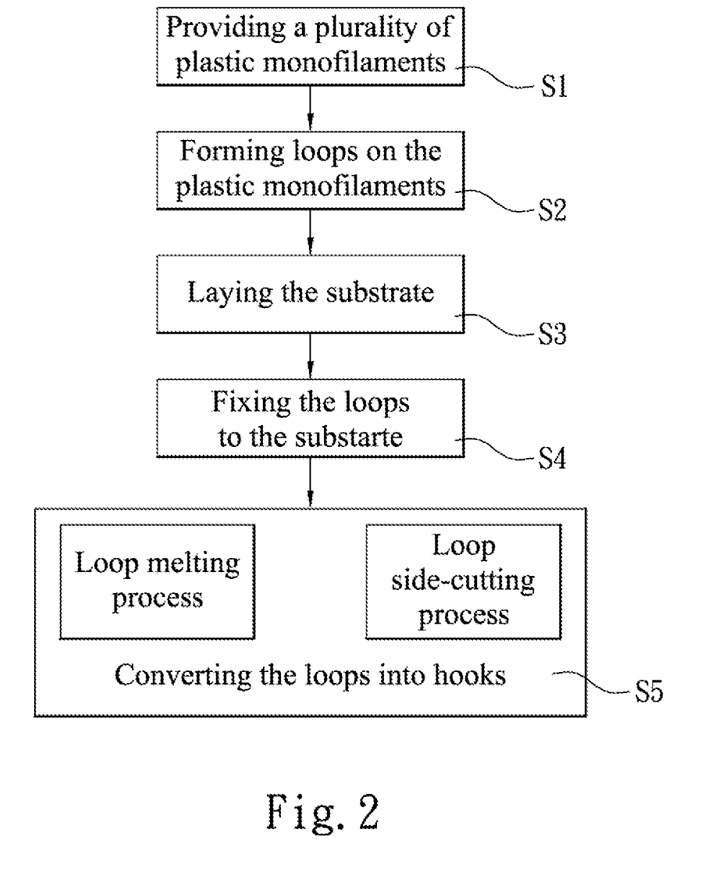
FIG. 2 is a flow diagram illustrating a method for manufacturing a hook member of a hook-and-loop fastener according to an embodiment of the present invention.
Figure 3A:
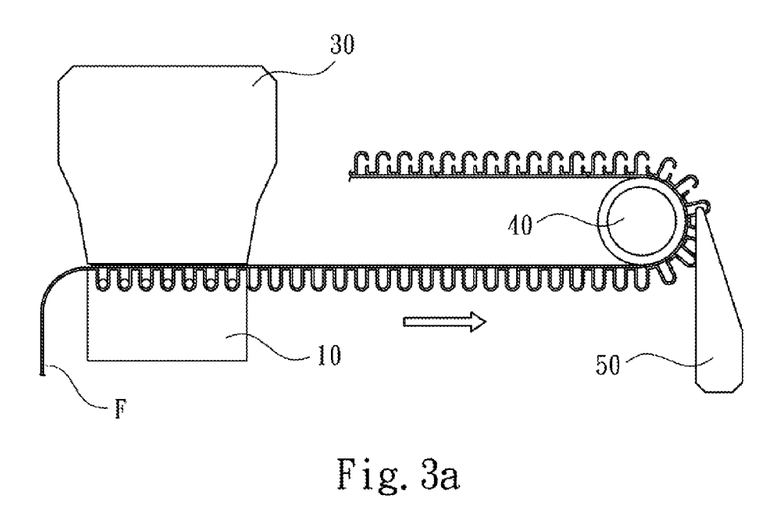
FIG. 3a is a schematic plane view showing an apparatus for performing the method for manufacturing a hook member of a hook-and-loop fastener according to one embodiment of the present invention.
Figure 3B:
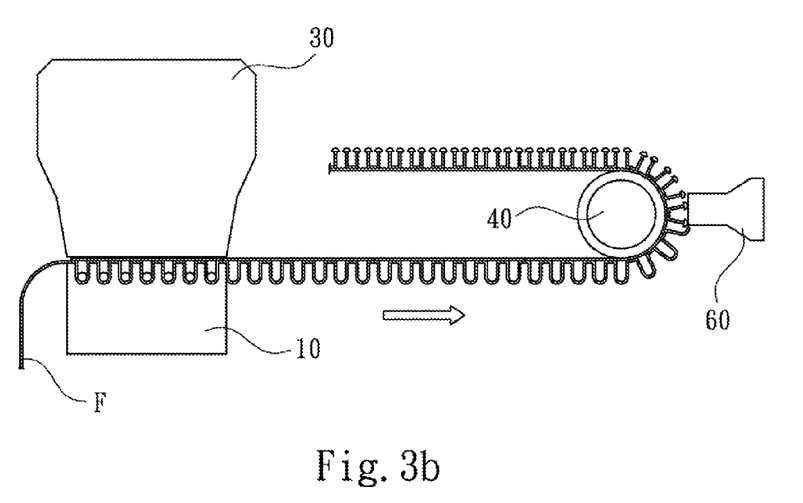
FIG. 3b is a schematic plane view showing an apparatus for performing the method for manufacturing a hook member of a hook-and-loop fastener according to another embodiment of the present invention.

Referring now to embodiments illustrated in FIGS. 2-4 to describe a method for manufacturing a hook member of a hook-and-loop fastener according to the present invention.

FIG. 2 is a flow chart showing the steps of the method for manufacturing a hook member of a hook-and-loop fastener according to the present invention. In step S1, a plurality of plastic monofilaments F (such as, nylon or polypropylene (PP) monofilaments) are provided. According to the embodiment illustrated in FIGS. 3 and 4, the plurality of plastic monofilaments F are provided in parallel and are equally spaced apart from each other. The plurality of plastic monofilaments F are provided to a mold 10 having a number of parallel grooves 12 spaced apart each other (see FIG. 4a), wherein the grooves 12 extend in a direction perpendicular to the longitudinal direction of the plastic monofilaments F. Next, in step S2, the plurality of plastic monofilaments F are formed with a plurality of loop portions. According to the embodiment illustrated in FIG. 4, a loop forming device 20 is used to perform this loop forming step. The loop forming device 20 includes a number of rods 22 arranged corresponding to the grooves 12 of the mold 10 for pushing the portions of the plurality of plastic monofilaments that lay on top of the grooves 12 of the mold 10 down into corresponding grooves 12 from above the mold 10 to form the portions of the plastic filaments F in the grooves 12 as loop portions and to form the portions left on the top surface of the mold 10 as flat portions of the plastic filaments F (see FIG. 4b).

Figure 4A:
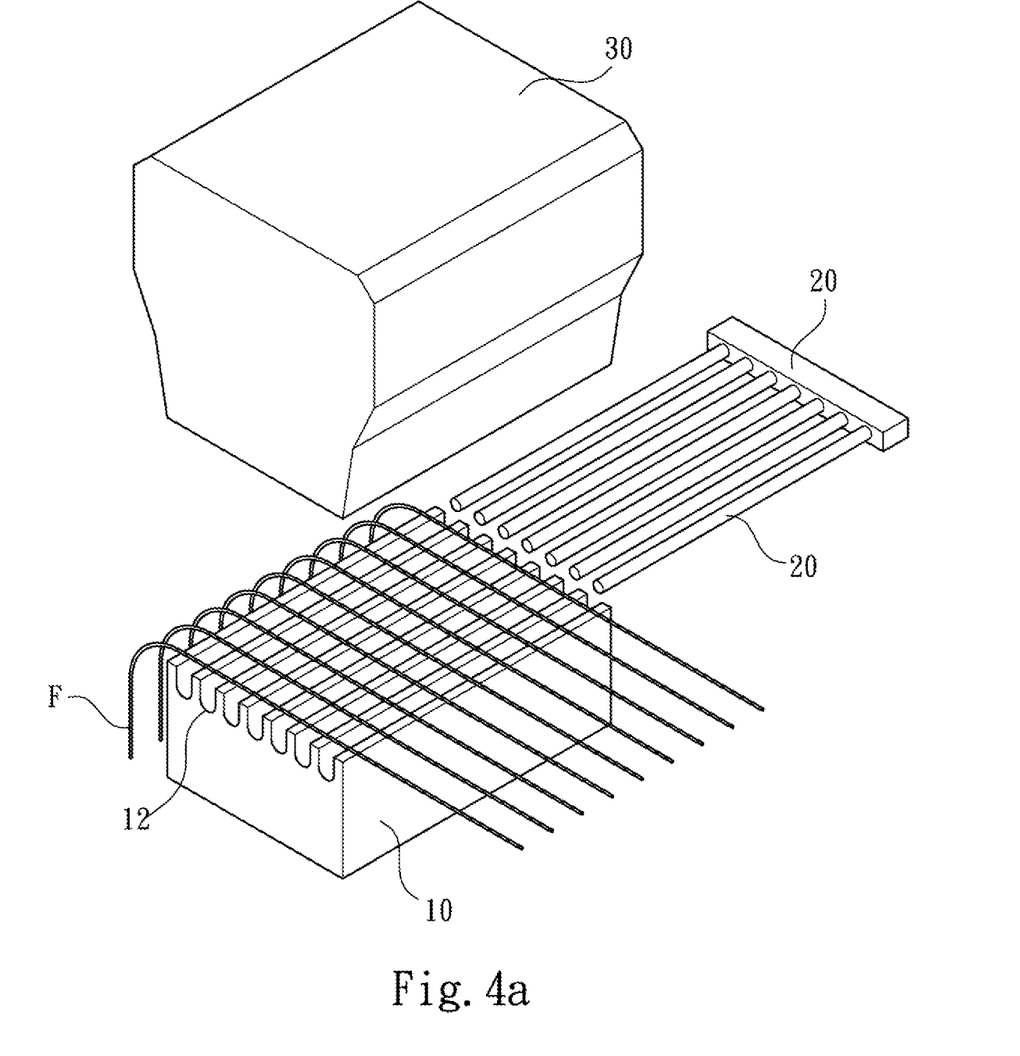
FIGS. 4a, 4b, 4c, 4d, 4e and 4f are schematic perspective views showing different stages of the method for manufacturing a hook member of a hook-and-loop fastener according to the present invention.
Figure 4B:
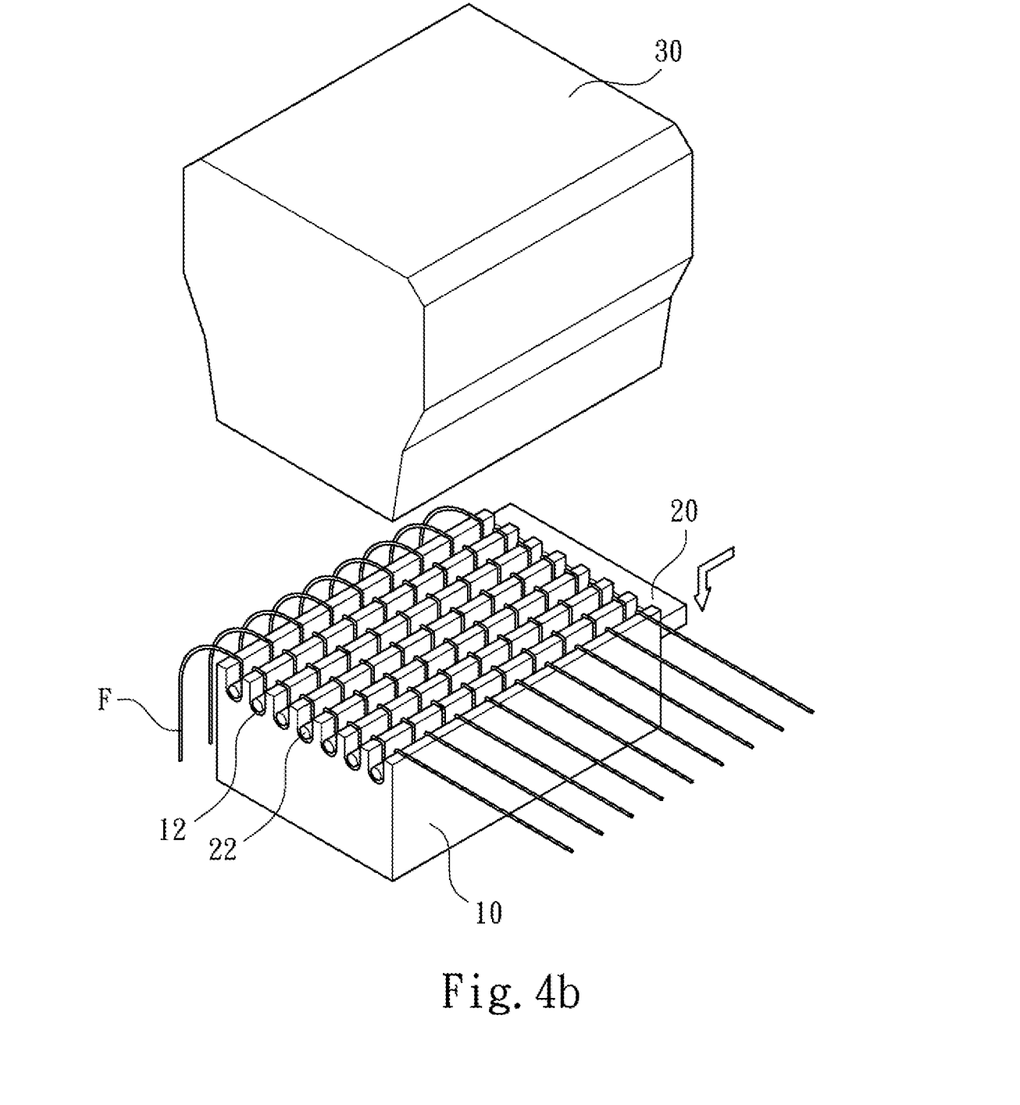
Figure 4C:
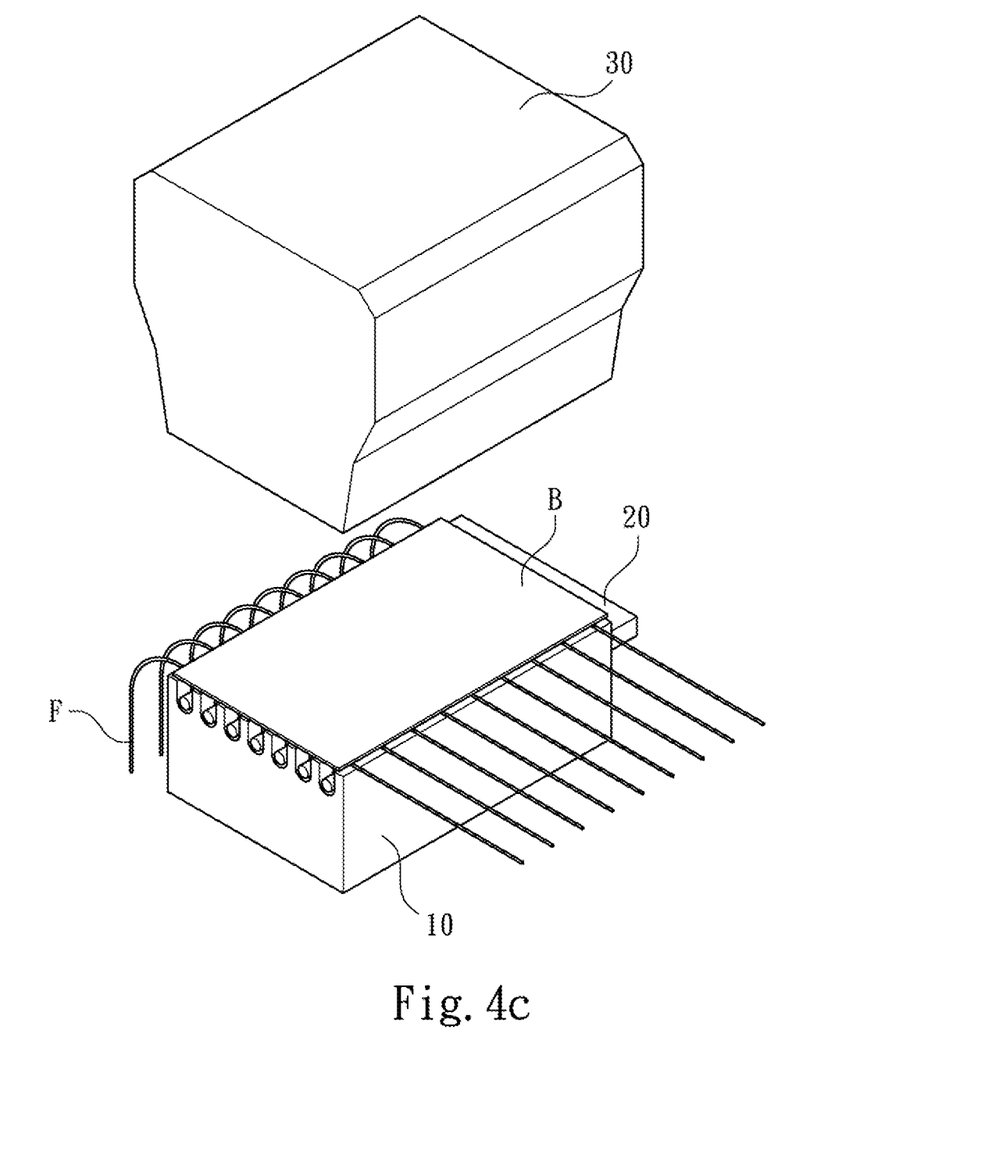
Figure 4D:
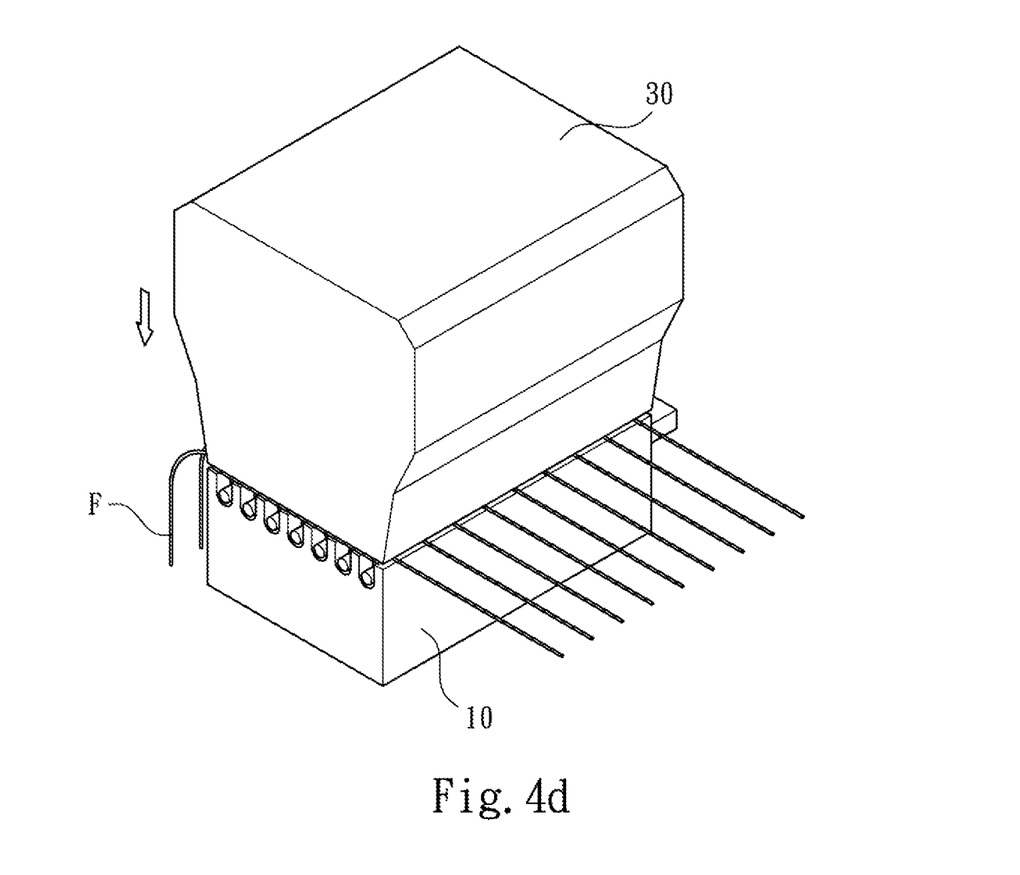
Figure 4E:
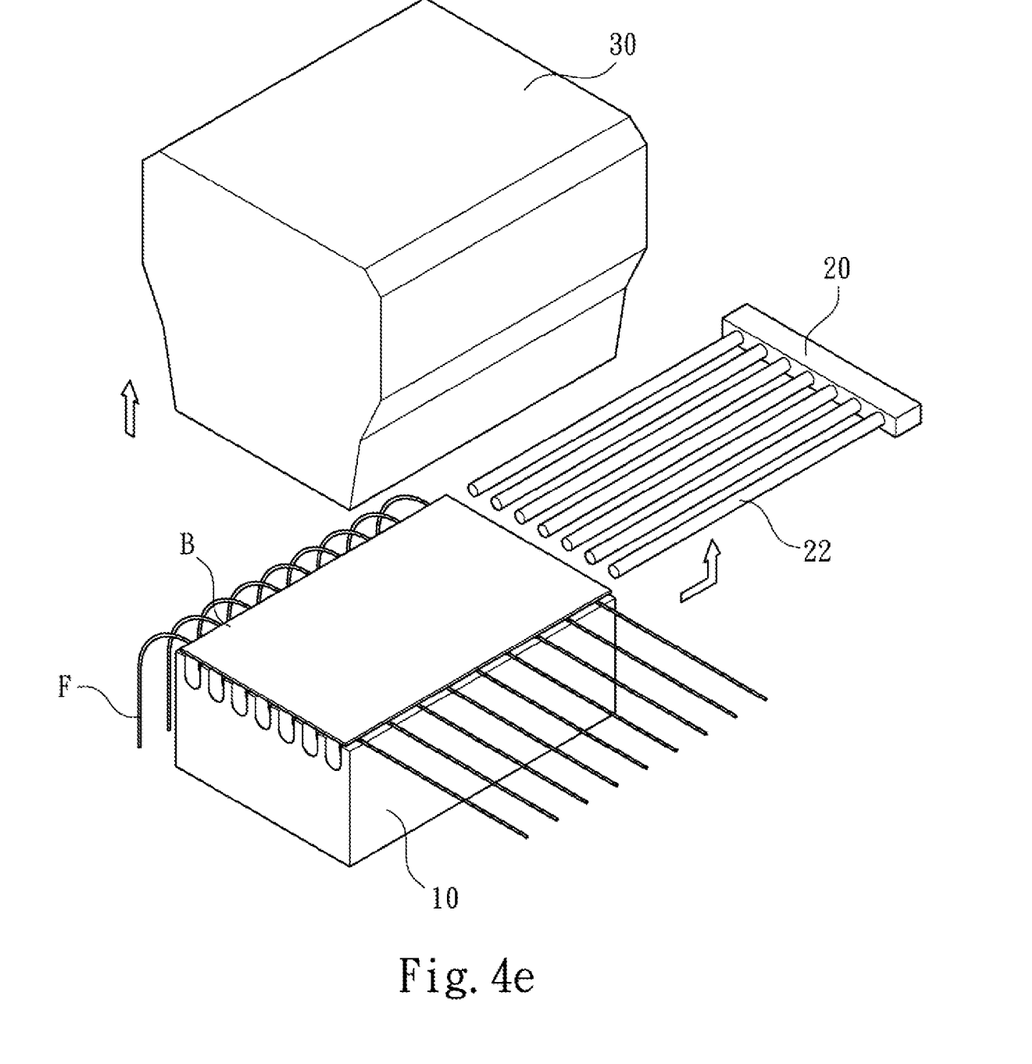
Figure 4F:
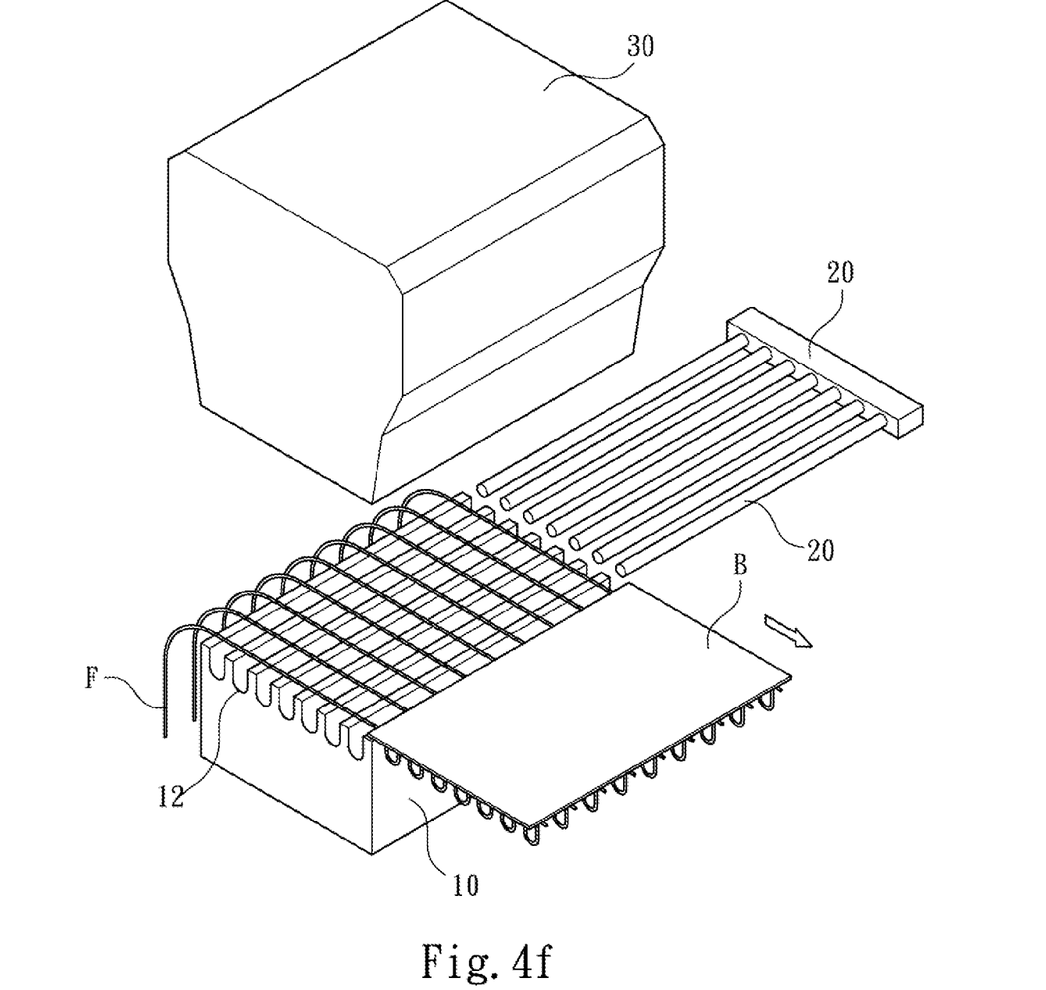

Next, in step S3, a web of substrate B is laid on the top surface of the mold 10 covering the flat potions that remain on the top surface of the mold 10, as illustrated in FIG. 4c. Then, in step S4, a fusing device 30 is used to carry out a fusing process. Preferably, the fusing device 30 may be an ultrasonic welding device or a thermal welding device. The fusing device 30 is moved and pressed against the substrate B that is laid on top of the mold 10 to apply ultrasonic energy or thermal energy to the substrate B to weld the substrate B and the flat portions of the plastic filaments F together, and thus fix the loop portions to the substrate B (see FIG. 4d). Then, the fusing device 30 is moved away from the mold 10 and the loop forming device 20 is moved sidewayly to withdraw the rods 22 out of the grooves 12 and to get ready for next processing cycle, as illustrated in FIG. 4e. Then, by means of a de-molding roller 40 (see FIG. 3a or 3b), the substrate B on which a plurality of loops are formed is pulled away from the mold 10 and at the same time the plastic filaments F for following operations are placed on the mold 10, as illustrated in FIG. 4f. That is, while performing the de-molding operation, the step Si of the next processing cycle is simultaneously carried out. Then, step S2 to S4 are repeated for continuously forming loops on the substrate B.

After the substrate B on which a plurality of loops are formed being pulled away from the mold 10, the hook elements forming step S5 is then carried out. According to one embodiment of the present invention, step S5 is a side-cutting process of the loops. Specifically, when the substrate B on which a plurality of loops are formed is moved to pass through the de-molding roller 40 as illustrated in FIG. 3a, one side of the loops is cut at a predetermined height above the substrate by a blade 50 to turn each loop into a hook portion (i.e., the hook element) having a hook-shaped head and a shorter redundant portion. The hook portion and the redundant portion will be turned away from each other while the loop is cut because of the internal stress generated in the loop during the loop forming step and thus the redundant portion will not hinder the hook portion to engage with loops on a loop member of a hook-and-loop fastener in use.

According to one embodiment of the present invention, step S5 is a melting process of the loops. Specifically, when the substrate B on which a plurality of loops are formed is moved to pass through the de-molding roller 40 as illustrated in FIG. 3b, a heater 60 disposed radially oppose to the de-molding roller 40 is arranged to melt a top portion of each of the loops to make each of the loop into two hook elements each having a mushroom-shaped head as shown in FIG. 3b.

The present invention utilizes a technique that is completely opposite to the traditional technique to manufacture a hook member of a hook-and-loop fastener. Specifically, in the traditional technique, a knitting process is used to form and fix the loops to the substrate; the present invention on the other hand utilizes a mold forming process forms the loops and a fusing/welding process to fix the loops to the substrate. A simpler, faster and more convenient method of manufacturing a hook member of a hook-and-loop fastener is thus obtained.

Although the present invention has been described above according to preferred embodiments of the method and the apparatus illustrated in the accompanying drawings, this does not mean that the scope of the present invention is limited to the specific steps or sequences of the method and configurations of the apparatus described above. In fact, there exist various modifications and variations under the principle and spirit disclosed above, For instance, the method described in U.S. patent application Ser. No. 12/929,829 may be used to form loops on the substrate.

It will be apparent to people skilled in this art that many modifications can be made to the disclosed structures/steps without departing from the true scope of the invention defined by the appended claims. Therefore, it is the intent of the appended claims to cover all such variations and modifications as come within the sprit and scope of this invention.

What is claimed is:

1. A method for manufacturing a hook member of a hook-and-loop fastener, comprising the steps of:
   providing a plurality of plastic monofilaments;
   forming a plurality of loops on each of the plurality of plastic monofilaments such that each of the plurality of plastic monofilaments has a plurality of loop portions and flat portions between adjacent loop portions;
   covering the flat portions of the plurality of plastic monofilaments with a web of substrate;
   fusing the flat portions of the plurality of plastic monofilaments to the substrate so as to fix the plurality of loop portions of the plastic monofilaments onto the substrate; and converting the plurality of loop portions into a plurality of hook elements to thereby producing the hook member that comprises a plurality of hook elements.

2. A method according to claim 1, wherein the step of converting the loop portions into hook elements comprises a step of:
performing a side-cutting process to the loop portions at a predetermined height above the substrate to form hook elements having hook-shaped heads.

3. A method according to claim 1, wherein the step of converting the loop portions into hook elements comprises a step of:
performing a thermal melting process to the loop portions at a top end thereof to form hook elements having mushroom-shaped heads.

4. A method according to claim 2, wherein the step of providing a plurality of plastic monofilaments comprises a step of:
providing the plurality of equally spaced parallel plastic monofilaments to a mold having a number of parallel grooves spaced apart form each other, wherein the grooves extend in a direction perpendicular to a longitudinal direction of the plastic monofilaments.

5. A method according to claim 3, wherein the step of providing a plurality of plastic monofilaments comprises a step of:
providing the plurality of equally spaced parallel plastic monofilaments to a mold having a number of parallel grooves spaced apart form each other, wherein the grooves extend in a direction perpendicular to a longitudinal direction of the plastic monofilaments.

6. A method according to claim 2, wherein the step of forming a plurality of loop portions comprises a step of:
pushing the portions of the plurality of plastic monofilaments laying on top of the grooves of the mold down into corresponding grooves with a loop forming device having a number of rods arranged corresponding to the grooves to form the loop portions of the plastic monofilaments and the portions laying on a top surface of the mold formed as the flat portions.

7. A method according to claim 3, wherein the step of forming a plurality of loop portions comprises a step of:
pushing the portions of the plurality of plastic monofilaments laying on top of the grooves of the mold down into corresponding grooves with a loop forming device having a number of rods arranged corresponding to the grooves to form the loop portions of the plastic monofilaments and the portions laying on a top surface of the mold formed as the flat portions.

8. A method according to claim 6, wherein the step of fusing the flat portions of the plurality of plastic monofilaments to the substrate comprises a step of:
pressing the substrate against the mold with the fusing device and fusing the substrate and the flat portions together by applying thermal energy thereto.

9. A method according to claim 7, wherein the step of fusing the flat portions of the plurality of plastic monofilaments to the substrate comprises a step of:
pressing the substrate against the mold with the fusing device and fusing the substrate and the flat portions together by applying thermal energy thereto.

10. A method according to claim 6, wherein the step of fusing the flat portions of the plurality of plastic monofilaments to the substrate comprises a step of:
pressing the substrate against the mold with the fusing device and fusing the substrate and the flat portions together by applying ultrasound energy thereto.

11. A method according to claim 7, wherein the step of fusing the flat portions of the plurality of plastic monofilaments to the substrate comprises a step of:
pressing the substrate against the mold with the fusing device and fusing the substrate and the flat portions together by applying ultrasound energy thereto.

12. A method according to claim 10, wherein the fusion device comprises a ultrasonic welder.

13. A method according to claim 11, wherein the fusion device comprises a ultrasonic welder.

14. A method according to claim 8, wherein the fusing device comprises a thermal welder.

15. A method according to claim 9, wherein the fusing device comprises a thermal welder.

16. A method according to claim 8, further comprises a de-molding step after the fusing step, wherein the de-molding step comprises the steps of:
moving the fusing device away from the mold;
sidewayly withdrawing the rods of the loop forming device from the groves; and
de-molding the substrate with a plurality of loops forming thereon from the mold by means of a de-molding roller.

17. A method according to claim 9, further comprises a de-molding step after the fusing step, wherein the de-molding step comprises the steps of:
moving the fusing device away from the mold;
sidewayly withdrawing the rods of the loop forming device from the groves; and
de-molding the substrate with a plurality of loops forming thereon from the mold by means of a de-molding roller.

18. A method according to claim 8, wherein the side-cutting process is performed with a blade to cut at one side of the loops when the substrate with a plurality of loops forming thereon passes through the de-molding roller.

19. A method according to claim 9, wherein the thermal melting process is performed with a heating device disposed oppose to the de-molding roller to melt the top portions of the loops when the substrate having a plurality of loops forming thereon passes through the de-molding roller.

* * * * *